United States Patent [19]

Skelly et al.

[11] 4,023,830
[45] May 17, 1977

[54] PRODUCTION OF IMAGES

[75] Inventors: James Kenneth Skelly, Wilmslow; James Harry Astbury, Stockport, both of England

[73] Assignee: Ciba-Geigy Corporation, Ardsley, N.Y.

[22] Filed: Apr. 23, 1975

[21] Appl. No.: 571,036

[30] Foreign Application Priority Data

Apr. 25, 1974 United Kingdom ............. 18199/74

[52] U.S. Cl. .............................. 282/27.5; 106/14.5; 106/22; 427/150; 427/151; 427/261; 427/288; 428/411; 428/537; 428/914

[51] Int. Cl.² ......................................... B41M 5/22

[58] Field of Search .......... 427/146, 150, 151, 261, 427/256, 288; 428/195, 199, 207, 211, 537, 913, 914, 411, 326; 282/27.5; 106/14.5, 20, 22, 23

[56] References Cited

UNITED STATES PATENTS

| | | | |
|---|---|---|---|
| 2,777,780 | 1/1957 | Cormack et al. | 427/151 X |
| 3,364,052 | 1/1968 | Martino | 427/261 X |
| 3,931,430 | 1/1976 | Tada et al. | 428/195 |

*Primary Examiner*—Thomas J. Herbert, Jr.
*Assistant Examiner*—Bruce H. Hess
*Attorney, Agent, or Firm*—Karl F. Jorda; Edward McC. Roberts; Prabodh I. Almaula

[57] ABSTRACT

An image producing system is provided which comprises a substrate having printed on at least a portion of a surface thereof an ink containing a neutral or substantially neutral ink vehicle, a liquid organic base and a color former, and which system also comprises a carrier material impregnated with a solutions of an organic acid in a weakly volatile high boiling solvent.

16 Claims, No Drawings

PRODUCTION OF IMAGES

The present invention relates to the production of images by the use of colour formers.

The use of colour formers in self-duplicating stationery has been known for many yeras, especially in pressuresensitive duplicating systems. Such systems consist of adjacent sheets of paper in which by pressure writing, e.g. by a ball-point pen or a typewriter, copies are produced on the underlying sheets without the need for interleaved carbon paper. Usually a solution of the colour former is contained in microcapsules which are coated on to the reverse side of the upper sheet and the front side of the bottom sheet or receiving sheet is coated with a co-reactive substance. In systems comprising more than two sheets, the intermediate sheets are coated on each side with the appropriate substance. When writing or typing on the top sheet the capsules are ruptured by impact, the colour former is brought into contact with the co-reactive substrate and a coloured image, being a copy of the original, is produced.

It is not always necessary to produce copies of an original, and in some instances it is even undesirable. We have found that in those cases where an original only is required using colour formers, it is not necessary to encapsulate the colour former. In addition, in the present invention colour formers and be used which are themselves not colourless but undergo a colour change when contacted with a co-reactive substance. In particular, azoic colour formers which are normally yellow in colour, but which undergo a colour change to destroy the yellow and produce a different colour when protonated can be used in the present invention. Such substances are often objectionable in conventional self-duplicating systems because the paper is a pale yellow colour.

According to the present invention there is provided an ink, e.g. a gravure, flexographic letterpress or litho ink which comprises a neutral or substantially neutral ink vehicle, a non-volatile liquid organic base and a colour former.

Any colour former or mixture of colour formers can be used. For example, the colour former may be a lactone type, spyropyran or related type, a leuco type, a metal complex forming type or, preferably, an azo compound, having the general formula I:

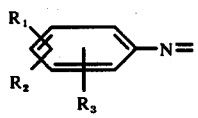

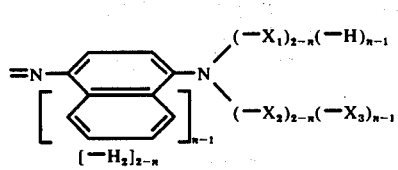

(I)

in which $R_1$, $R_2$ and $R_3$ each represents hydrogen, halogen, alkyl, alkoxy, aryloxy, alkoxycarbonyl, dialkylaminocarbonyl, acylamino, acyl(alkyl)amino,

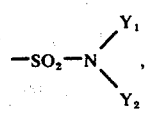

in which $Y_1$ and $Y_2$ each represents alkyl or aryl, or in which $Y_1$ and $Y_2$ together represent an alkylene group; $X_1$ is hydrogen or an alkyl group, $X_2$ is an alkyl, cyanoalkyl or arylmethylene group or $X_1$ and $X_2$ together represent an alkylene group, $X_3$ is an alkyl or aryl group and n is 1 or 2, preferably 1, of the formula II:

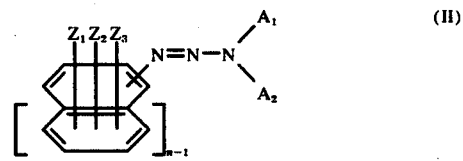

(II)

in which $Z_1$, $Z_2$ and $Z_3$ each represents hydrogen, alkyl, substituted alkyl, alkoxy, halogen, nitro, acylamino, aminoacyl or alkoxycarbonyl, $A_1$ and $A_2$ each represents alkyl or phenyl or $A_1$ and $A_2$ together with the nitrogen atom to which they are bound form a heterocyclic ring system and n is 1 or 2.

Suitable ink vehicles are those which have a pH of about 7. If the pH is not exactly 7 it is preferably slightly above rather than below 7. Examples of such vehicles are nitrocellulose, zinc resinate, vinyl, acrylic polyamide and alkyd resins, ethyl cellulose, stand oils and resin moxified stand oils. The liquid organic base may be an amine or an alkanolamine such as triethanolamine or diethanolamine. The ink may contain other conventional ingredients such as an alcohol, e.g. ethanol, propanol or methylated spirits, in amounts up to the amount of ink vehicle, preferably up to about 80% by weight of the ink vehicle.

When the ink is printed on to a paper substrate or the like, the colour former is prevented from producing a colour by the organic base, a colour only being produced when the printing on the paper is treated with an activating substance which counteracts the organic base. Suitable activating substances are organic acids such as maleic acid, oxalic acid, malonic acid, succinic acid, glutaric acid, adipic acid, tricarballylic acid, diglycollic acid, lactic acid, malic acid, tartaric acid, citric acid, pyrophosphonic acid, benzene sulphonic acid, naphthalene-2-sulphonic acid, 1-phenol-4-sulphonic acid, polymaleic acid, co- and ter-polymers of maleic acid with ethyl acrylate and vinyl acetate, hydroxyethane diphosphonic acid, methylamino-N-N-dimethylene phosphonic acid. The preferred acid is maleic acid.

When the colour former is a triazene compound of formula II it also needs to be contacted with an azo coupling component.

The present invention also provides an image producing system which comprises a substrate having printed on at least a portion of a surface thereof an ink, as defined above, and a carrier material impregnated with a solution of an organic acid in a weakly volatile high boiling solvent.

The invention also provides a method of producing an image which comprises printing on to a substrate an ink as defined above, impregnating a carrier material with a solution of an organic acid in a weakly volatile high boiling solvent and transferring the organic acid on to said printed ink.

The amount of colour former in the ink varies according to the particular colour former used and on the desired effect, i.e., whether a dark colour is required or not. In general the amount used may be from 0.01% to 2%, preferably 0.01% to 1% and more preferably 0.1% to 0.5% by weight, e.g. 0.2%.

The amount of organic base in the ink may vary over a wide range, but should be sufficient to ensure that no reaction occurs between the colour former and the substrate on which the ink is printed. The amount may be up to 40% by weight, although amounts of up to 10% are sufficient on most substrates. The amount used is preferably from 0.2% to 6%, more preferably 0.2% to 2%.

The ink may also contain a plasticiser, particularly when nitrocellulose is used in the vehicle in order to ensure that the organic acid has access to the colour former in the ink after storage, i.e., the ink vehicle is prevented from becoming too impervious during storage. Plasticisers which may be used include the various alkyl and aryl phosphates, phthalates, adipates, azalates, sebacates and glycolates. The requirements in choosing a plasticiser are that the colour former must be soluble in it and must not react with the colour former or cause it to react with the substrate. The amounts of plasticiser may be from 5–15% by weight, based on the vehicle, preferably about 10% by weight. If the plasticiser itself acts as a de-activating agent, e.g. butyl phthaloyl butyl glycollate it may be used in place of part of the de-activator.

The ink may also contain a pigment so that when printed on the substrate a coloured image is produced but which, when contacted by the organic acid changes colour. For example, the colour former may be one which turns to blue, red or green when contacted with the acid. If these are mixed with various pigments the following effects are possible:

| Pigment Colour | Colour Change |
|---|---|
| Blue | Blue ⟶ different Blue |
| Blue | Blue ⟶ Red |
| Blue | Blue ⟶ Green |
| Green | Green ⟶ Blue |
| Green | Green ⟶ Red |
| Yellow | Yellow ⟶ Green |
| Yellow | Yellow ⟶ Red |
| Yellow | Yellow ⟶ Blue |
| Red | Red ⟶ different Red |
| Red | Red ⟶ Blue |
| Red | Red ⟶ Green |

In addition, Black may be produced if a mixture of different colour formers is used, the colours of which with the pigment mix to form black.

Various pigments may be used and include organic pigments such as azo, azomethine, phthalocyanines, polycyclic pigments such as quinacridones, dioxazines, vat dyestuffs, anthraquinones and isoindolinones and salts of basic pigments precipitated with the heteropoly acids of phosphorus, tungsten and molybdenum. Inorganic pigments may also be used, such as titanium dioxide and red and yellow iron oxides.

The substrate is preferably paper which has been formed using a neutral or alkaline size and thus will not react with the colour former. The paper may be sized with aluminium sulphate, rosin size and sodium aluminate to produce a neutral sized paper, or with a ketene dimer to produce an alkaline sized paper. In order to improve the print definition the paper may be coated or filled with a clay such as Sylton Attapulgite or china clay, or a particulate urea-formaldehyde resin.

The carrier material which is impregnated with the organic acid solution may be a fabric such as is used, for example, in typewriter ribbons, a paper material, possibly in ribbon form, such as crepe paper, wet laid or dry laid paper, or a felt or fabric pad such as are used with a rubber or metal stamp. It is preferred to absorb the organic acid on to a fabric ribbon to produce a typewriter ribbon, or on to a felt or fabric pad. The organic acid is then transferred on to the substrate by typing with the ribbon, or by means of a stamp from the pad. The carrier material may be impregnated with from 5 – 200% of its dry weight of the organic acid solution, preferably from 5 – 100%.

The solvent used to dissolve the organic acid may be any weakly volatile high boiling solvent having a boiling point of at least 150° C., preferably at least 300° C. Suitable solvents include, for example, partially hydrogenated terphenyl alone or mixed with other solvents such as liquid paraffin, tricresyl phosphate, di-n-butyl phthalate, dioctyl phthalate, trichlorobenzene, glycerol nitrobenzene, trichloroethyl phosphate or water-insoluble hydrocarbon oils, alkyl phthaloyl butyl glycollates, such as propyl-, pentyl-, hexyl- or preferably butyl-phthaloyl butyl glycollate, diethylene glycol, triethylene glycol or polyethylene glycols having a molecular weight of from 200 to 600, e.g. 400.

The amount of organic acid in the solvent is preferably such as to give a saturate solution. Lower amounts may be used, but are less satisfactory. The resulting organic acid solution must have some water present if an azo compound of formula I is used, but the amount can be very small, even minute amounts being sufficient. The amount of which is normally present in the acid is sufficient.

When the colour formers are azo compounds of the formula I, they are preferably those of the general formula III:

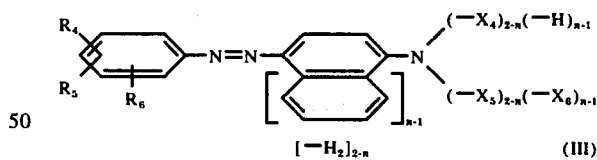

in which $R_4$, $R_5$ and $R_6$ each represent lower alkyl, lower alkoxy, halogenphenoxy, phenoxy, lower alkoxycarbonyl, lower dialkylaminocarbonyl, acetylamino, halogen, acetyl(lower alkyl)amino,

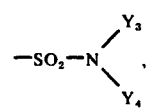

in which $Y_3$ and $Y_4$ each represents lower alkyl or phenyl, or in which $Y_3$ and $Y_4$ together represent an alkylene group with 4 or 5 carbon atoms and, at most two of the radicals $R_4$, $R_5$ and $R_6$ being hydrogen, $X_4$ is hydrogen or lower alkyl, $X_5$ is lower alkyl, lower cyanoalkyl or benzyl, or $X_4$ and $X_5$ together represent an alkylene group with 4 or 5 carbon atoms, $X_6$ is lower alkyl or phenyl and n is 1 or 2.

Of special interest are azo compounds of the formula IV:

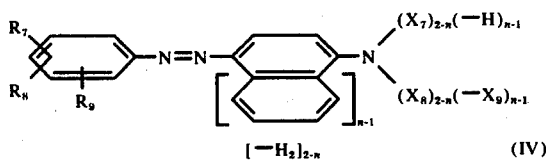

in which $R_7$, $R_8$ and $R_9$ each represents methyl, methoxy, phenoxy, dichlorophenoxy, methoxycarbonyl, dimethylaminocarbonyl, acetylamino, chlorine, acetyl(methyl)amino, $SO_2$—N—$Y_6Y_5$, in which $Y_5$ and $Y_6$ each represent methyl, ethyl or phenyl or in which $Y_5$ and $Y_6$ together represent a pentylene group, at most two of the radicals, $R_7$, $R_8$ and $R_9$ being hydrogen, $X_7$ is methyl or ethyl, $X_8$ is methyl, 2-cyanoethyl or benzyl, $X_9$ is methyl or ethyl and n is 1 or 2.

Advantageous results are obtained with colour formers of the formula V:

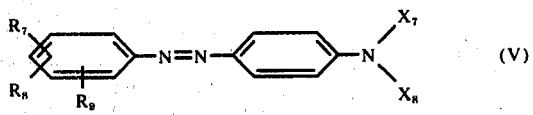

in which $R_7$, $R_8$, $R_9$, $X_7$ and $X_8$ have the meanings given above, and very suitable and colour formers of the formula VI:

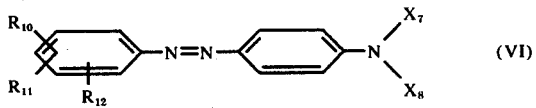

in which $R_{10}$, $R_{11}$ and $R_{12}$ each represents methoxy, methoxycarbonyl chlorine, diethylaminosulfonyl or acetylamino, at most two of the radicals $R_{10}$, $R_{11}$ and $R_{12}$ being hydrogen and $X_7$ and $X_8$ have the meanings given above.

The terms lower alkyl or lower alkoxy in the definitions of radicals of the colour formers means radicals with 1 to 5, especially 1 to 3 carbon atoms, such as methyl, ethyl, propyl, benzyl or amyl.

When one or more of the R-radicals contain acyl groups, the acyl radical may be derived, for example, from an aliphatic monocarboxylic acid having 1 to 4 carbon atoms such as acetic acid.

When one or more of the R-radicals is halogen it is, e.g. iodine, bromine but preferably chlorine.

When $Y_1$ and $Y_2$ or $Y_3$ and $Y_4$ together represent an alkylene group they form together with the nitrogen atom a heterocyclic ring such as piperidine or pyrrolidine.

Aryl radicals in any of the definitions of the colour formers especially mean naphthalene, diphenyl and preferably benzene radicals.

These colour formers may be prepared by conventional methods known in the art, e.g. by diazotizing a substituted aniline and coupling it onto a N-substituted aniline.

Specific Examples of compounds of general formula I which may be used in the present invention are given in Table I, in which n in formula I and 1 and in Table II in which n is formula I is 2.

Table I

| No. | $R_1$ | $R_2$ | $R_3$ | $X_1$ | $X_2$ | Absorption maximum λmax. in nm free base | protonated | Colour of protonated dye* |
|---|---|---|---|---|---|---|---|---|
| 1 | —H | —H | 4-$CH_3$CONH | —$CH_3$ | —$CH_3$ | 411 | 550 | violet |
| 2 | 2-$CH_3$ | —H | —H | —$CH_3$ | —$CH_3$ | 401 | 506 | orange |
| 3 | —H | 3-$CH_3$ | —H | —$CH_3$ | —$CH_3$ | 406 | 520 | red |
| 4 | —H | —H | 4-$CH_3$ | —$CH_3$ | —$CH_3$ | 404 | 528/542 | red |
| 5 | 2-$OCH_3$ | —H | —H | —$CH_3$ | —$CH_3$ | 413 | 540 | violet |
| 6 | —H | —H | 4-$OCH_3$ | —$CH_3$ | —$CH_3$ | 404 | 556 | violet |
| 7 | 2-$OCH_3$ | —H | 4-$OCH_3$ | —$CH_3$ | —$CH_3$ | 412 | 578 | blue-grey |
| 8 | 2-$OCH_3$ | —H | 5-$OCH_3$ | —$CH_3$ | —$CH_3$ | 425 | 560 | grey |
| 9 | —H | 3-Cl | —H | —$CH_3$ | —$CH_3$ | 416 | 510 | orange |
| 10 | —H | —H | 4-Cl | —$CH_3$ | —$CH_3$ | 415 | 519 | orange |
| 11 | —H | 3-Cl | 4-$CH_3$ | —$CH_3$ | —$CH_3$ | 413 | 510 | orange |
| 12 | 2-$CH_3$ | —H | 4-Cl | —$CH_3$ | —$CH_3$ | 414 | 506 | orange |
| 13 | 2-$CH_3$ | —H | 5-Cl | —$CH_3$ | —$CH_3$ | 418 | 506 | orange |
| 14 | 2-$CH_3$ | 4-$OCH_3$ | 5-Cl | —$CH_3$ | —$CH_3$ | 420 | 574 | green-grey |
| 15 | 2-$OC_6H_5$ | —H | 5-Cl | —$CH_3$ | —$CH_3$ | 430 | 518 | orange |
| 16 | O—C(Cl)(Cl)-phenyl | —H | —H | —$CH_3$ | —$CH_3$ | 418 | 518 | orange |
| 17 | 2-$COOCH_3$ | —H | —H | —$CH_3$ | —$CH_3$ | 417 | 518 | cerise red |
| 18 | —H | 3-$SO_2$—N(piperidine) | 4-$CH_3$ | —$CH_3$ | —$CH_3$ | 420 | 514 | orange |
| 19 | —H | 3-$SO_2$—N($CH_3$)($C_6H_5$) | 4-$CH_3$ | —$CH_3$ | —$CH_3$ | 419 | 517/535 | orange |
| 20 | —H | 3-$CH_3$ | 4-$OCH_3$ | —$CH_3$ | —$CH_3$ | 408 | 542 | brown |

Table I-continued

| No. | R₁ | R₂ | R₃ | X₁ | X₂ | λmax. free base | in nm protonated | Colour of protonated dye* |
|---|---|---|---|---|---|---|---|---|
| 21 | —H | —H | 3-NH(COCH₃)(CH₃) | —CH₃ | —CH₃ | 418 | 520 | orange |
| 22 | —H | —H | 4-CO—N(CH₃)(CH₃) | —CH₃ | —CH₃ | 421 | 516 | orange |
| 23 | —H | —H | 4-N(H)(COCH₃) | —CH₃ | —CH₂CH₂CN | 405 | 556 | violet |
| 24 | —H | 3-CH₃ | —H | —CH₃ | —CH₂CH₂CN | 356 | 522/538 | red |
| 25 | —H | —H | 4-CH₃ | —CH₃ | —CH₂CH₂CN | 396 | 534 | brown |
| 26 | 2-OCH₃ | —H | —H | —CH₃ | —CH₂CH₂CN | 400 | 542 | brown |
| 27 | 2-OCH₃ | —H | 5-OCH₃ | —CH₂ | —CH₂CH₂CN | 416 | 566 | grey |
| 28 | —H | 3-Cl | —H | —CH₃ | —CH₂CH₂CN | 406 | 513/534 | orange |
| 29 | —H | —H | 4-Cl | —CH₃ | —CH₂CH₂CN | 404 | 523/541 | orange |
| 30 | —H | 3-Cl | 4-CH₃ | —CH₃ | —CH₂CH₂CN | 404 | 523/540 | orange |
| 31 | —H | 3-CH₃ | —H | —C₂H₅ | —CH₂—C₆H₅ | 400 | 524/543 | brown-orange |
| 32 | 2-COOCH₃ | —H | —H | —C₂H₅ | —CH₂—C₆H₅ | 418 | 527/542 | red |
| 33 | 2-CH₃ | 3-Cl | —H | —CH₃ | —CH₃ | 413 | 500 | orange |
| 34 | 2-O—C₆H₅ | —H | 5-t-C₅H₁₁ | —CH₃ | —CH₃ | 416 | 526 | orange |
| 35 | —H | —H | 4-OCH₃ | —CH₃ | —CH₂CH₂CN | 398 | 555 | brown |
| 36 | 2-OCH₃ | 4-OCH₃ | 5-Cl | —CH₃ | —CH₂CH₂CN | 412 | 574 | brown-brown |
| 37 | 2-OCH₃ | —H | -5-SO₂—N(C₂H₅)(C₂H₅) | —CH₃ | —CH₃ | 427 | 522 | violet |

*Colour here refers to protonation in a solution of 95% acetic acid.

Table II

| No. | R₁ | R₂ | R₃ | X₃ | λmax. free base | in nm protonated | Colour of protonated dye |
|---|---|---|---|---|---|---|---|
| 101 | —H | 3—SO₂—N(phenyl) | 4—CH₃ | —C₂H₅ | | | violet |
| 102 | —H | 3—SO₂—N(CH₃)(CH₃) | 4—CH₃ | —C₂H₅ | | | violet |
| 103 | 2—CH₃ | —H | 4—Cl | —C₂H₅ | 466 | 540 | violet |

When the colour former is one of general formula II, defined above, alkyl and alkoxy in the definitions of $Z_1$, $Z_2$, $Z_3$, $A_1$ and $A_2$ usually are lower alkyl or alkoxy, which as a rule do not contain more than 4 carbon atoms, e.g. N-butyl, n-butoxy, n-propyl, isopropyl, ethyl, ethoxy, methyl or methoxy. Substituents for alkyl in $Z_1$, $Z_2$ or $Z_3$, e.g. are halogen, hydroxy or lower alkoxy.

The term "halogen" may represent iodine, but preferably bromine or chlorine. The term acylamino preferably means a radical of an aliphatic or aromatic sulfonic or particularly carboxylic acid amide whereby the amide nitrogen may be substituted by lower alkyl. Especially preferred are radicals of an alkane carboxylic acid amide, where the amide nitrogen optionally is substituted by methyl, such as a formic acid amide, acetic acid amide or propionic acid amide radical or radicals of a benzene carboxylic acid amide such as benzoic acid amide.

The term aminoacyl as a rule stands for an amine substituted —CO— or —SO₂— group. The amine radical thereby may be of a primary or secondary aliphatic or an heterocyclic amine. Preferred triazenes correspond to the formula VII.

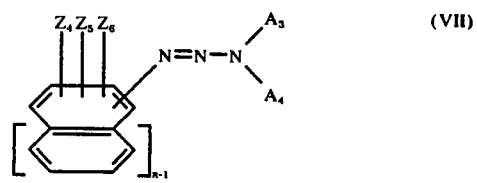

(VII)

in which $Z_4$, $Z_5$ and $Z_6$ each represents hydrogen, alkyl with 1 to 4 carbon atoms, alkoxy with 1 to 4 carbon atoms, halogen, nitro, —N(—X₁)—CO—X₂ or

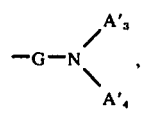

or COOX₃, X₁ and X₂ each representing hydrogen, alkyl with 1 to 4 carbon atoms or phenyl, X₃ represents alkyl with 1 to 4 carbon atoms, G is —CO— or —SO₂—, A₃, A₄, A₃' and A₄' each represent alkyl with 1 to 4 carbon atoms or phenyl or A₃ and A₄, and A₃' and A₄' respectively together with the nitrogen atom to which they are bound form a heterocyclic ring system with one or two rings, each ring containing 5 to 7 ring members and n is 1 or 2.

Of special interest are triazenes of the formula VIII:

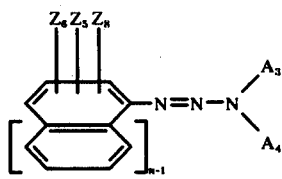

VIII in which $Z_7$ and $Z_8$ each represent hydrogen, alkyl with 1 to 4 carbon atoms, alkoxy with 1 to 4 carbon atoms or halogen, and $Z_6$, $A_3$, $A_4$ and n have the meaning given above.

Advantageous results are obtained with colour formers of the formula IX:

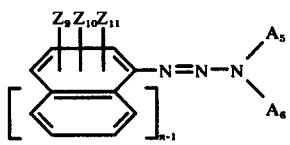

(IX)

in which $Z_9$ represents hydrogen, alkyl with 1 or 2 carbon atoms, alkoxy with 1 or 2 carbon atoms, halogen, nitro, $-N(-X_4)-$ $CO-X_5$, $-G-N_{A_6}^{A_5}$ or $-COOX_6$, $X_4$ represents hydrogen, alkyl with 1 or 2 carbon atoms or phenyl, $X_5$ represents alkyl with 1 or 2 carbon atoms, $X_6$ represents alkyl with 1 or 2 carbon atoms or phenyl, $Z_{10}$ and $Z_{11}$ each represent hydrogen, alkyl with 1 or 2 carbon atoms, alkoxy with 1 or 2 carbon atoms or halogen, G represents —CO— or —SO₂—; $A_5$, $A_6$, $A_5'$ and $A_6'$ each represent alkyl with 1 or 2 carbon atoms or phenyl or $A_5$ and $A_6$ and $A_5'$ and $A_6'$ respectively together with the nitrogen atoms to which they are bound form a heterocyclic ring system with one or two rings consisting of carbon, nitrogen and at most one oxygen as ring members, each ring containing 5 to 7 ring members and the ring system containing at most 10 ring members.

Very suitable colour formers are triazenes of the formula X:

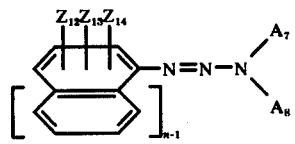

(X)

in which $Z_{12}$ represents hydrogen, methyl, methoxy, chlorine, nitro,

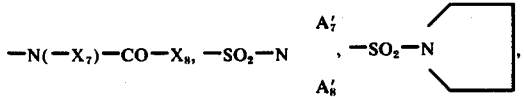

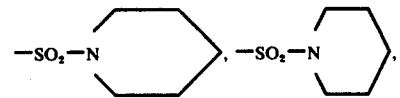

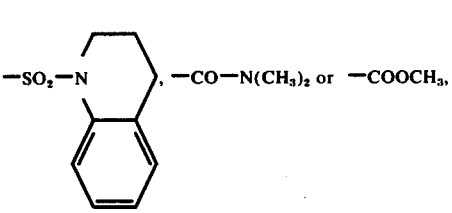

$Z_{13}$ is hydrogen, methyl, methoxy or chlorine
$Z_{14}$ is hydrogen or methoxy
$A_7'$ is methyl, ethyl or phenyl
$A_8'$ is methyl, ethyl or hydrogen
$A_7$ is methyl, ethyl or phenyl
$A_8$ is methyl or ethyl or $A_7$ and $A_8$ together with the nitrogen atom to which they are bound represent

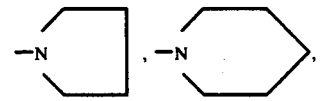

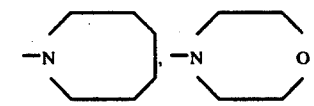

$X_7$ is hydrogen or methyl, $X_8$ is methyl or phenyl and n is 1 or 2.

These colour formers as such either are well known or may be prepared by conventional methods known in the art. A general method e.g. can be described thus:

The primary aromatic amine is dissolved in hydrochloric acid and water, then the solution is cooled to 0° C with ice. Sodium nitrite is added beneath the surface at such a rate that a slight excess of nitrous acid is always present. When the diazotisation is complete the reaction mixture is added to a solution or suspension of the secondary amine and sodium hydrogen carbonate in water at 10° C. The reaction mixture is stirred and allowed to reach room temperature. Stirring is continued until no diazonium compound can be detected. The product is out of solution and is filtered off or extracted into an organic solvent, washed with water and dried in vacuo at temperature below 50° C.

These colour formers as such are colourless and can form coloured images when brought into contact with a typical azoic coupling substance and the organic acid.

Suitable colour formers of the formula II, e.g. are:

Table III

| | symbols in formula II | | | | | | |
|---|---|---|---|---|---|---|---|
| No. | $Z_1$ | $Z_2$ | $Z_3$ | n | position —N═N | $A_1$ | $A_2$ |
| 201 | 3—SO₂N(CH₃)₂ | 4-CH₃ | H | 1 | I | —CH₃ | —CH₃ |
| 202 | | | | | | —C₂H₅ | —C₂H₅ |
| 203 | | | | | |  | |

Table III-continued

| No. | R₁ | | | | | A₁ | A₂ |
|-----|----|----|----|----|----|-----|-----|
| 204 | | | | | | \_/⁀\_ (5-ring) | |
| 205 | | | | | | \_/⁀\_ (6-ring) | |
| 206 | | | | | | \_/⁀O (6-ring with O) | |
| 207 | 3—SO₂N(C₂H₅)₂ | | | | | —CH₃ | —CH₃ |
| 208 | | | | | | (5-ring) | |
| 209 | | | | | | (6-ring) | |
| 210 | | | | | | (6-ring with O) | |
| 211 | 3—SO₂—N⟨pyrrolidine⟩ | | | | | —CH₃ | —CH₃ |
| 212 | | | | | | (5-ring) | |
| 213 | | | | | | (6-ring) | |
| 214 | | | | | | (6-ring with O) | |
| 215 | | | | | | | |
| 216 | 3—SO₂—N⟨piperidine⟩ | | | | | —CH₃ | —CH₃ |
| 217 | | | | | | (5-ring) | |
| 218 | | | | | | (6-ring) | |
| 219 | | | | | | (6-ring) | |
| 220 | | | | | | (6-ring with O) | | symbols in formula II

| No. | R₁ | R₂ | R₃ | n | position —N=N | A₁ | A₂ |
|-----|----|----|----|---|---|-----|-----|
| 221 | 3—SO₂—N⟨hexamethyleneimine⟩ | 4-CH₃ | H | 1 | 1 | —CH₃ | —CH₃ |
| 222 | | | | | | (5-ring) | |
| 223 | | | | | | (6-ring) | |
| 224 | | | | | | (6-ring) | |
| 225 | | | | | | (6-ring with O) | |
| 226 | 3—SO₂—NH—C₆H₅ | | | | | —CH₃ | —CH₃ |
| 227 | 3—SO₂—N(CH₃)(C₆H₅) | | | | | | |
| 228 | | | | | | (5-ring) | |
| 229 | | | | | | (6-ring) | |
| 230 | | | | | | (6-ring) | |

Table III-continued

| No. | $Z_1$ | $Z_2$ | $Z_3$ | n | position —N=N | $A_1$ | $A_2$ |
|---|---|---|---|---|---|---|---|
| 231 | | | | | |  O | |
| 232 | 3—SO₂—N(C₂H₅)(C₆H₅) | | | | | 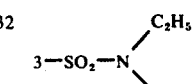 | |
| 233 | 3—SO₂—N(indoline) | | | | | —CH₃ | —CH₃ |
| 234 | | | | | | —C₂H₅ | —C₂H₅ |
| 235 | | | | | |  | |
| 236 | | | | | | 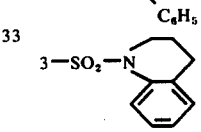 | | symbols in formula II

| No. | $Z_1$ | $Z_2$ | $Z_3$ | n | position —N=N | $A_1$ | $A_2$ |
|---|---|---|---|---|---|---|---|
| 237 | | | | | | 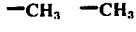 O | |
| 238 | 4—N(CO—CH₃)(CH₃) | H | | | | | |
| 239 | 4—NH—CO—C₆H₅ | 2—OCH₃ | 5—OCH₃ | | | | |
| 240 | 4—CO—N(CH₃)(CH₃) | H | H | | | | |
| 241 | 2—COOCH₃ | | | | | | |
| 242 | 4—NO₂ | H | H | I | I | 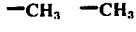 | |
| 243 | 4—Cl | 2—CH₃ | | | | | |
| 244 | 5—OCH₃ | 2—OCH₃ | | | | | |
| 245 | 4—OCH₃ | | | | | | |
| 246 | | | 5—Cl | | | | |
| 247 | 4—SO₂N(C₂H₅) | H | H | | | | |
| 248 | 4—SO₂—N(piperidine) | | | | | | |
| 249 | 2—SO₂N(C₂H₅)(C₆H₅) | | | | | | |
| 250 | 3—SO₂—N(piperidine) | | | | | | |
| 251 | 5—SO₂N(C₂H₅)₂ | 2—OCH₃ | | | | | |
| 252 | | | | | | 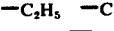 | —CH₃ —C₆H₅ |
| 253 | 4—Cl | 2—CH₃ | | | | | |
| 254 | 4—OCH₃ | 2—OCH₃ | | | | | |
| 255 | 5—OCH₃ | | | | | | |
| 256 | 5—Cl | 2—Cl | | | | | |
| 257 | | 2—CH₃ | | | | | |
| 258 | 4—SO₂N(C₂H₅)₂ | H | | | | —CH₃ | —CH₃ |
| 259 | 4—SO₂—N(piperidine) | | | | | | |
| 260 | 5—SO₂—N(C₂H₅)₂ | | | | | —C₂H₅ | —C₂H₅ |
| 261 | —H | | | | 2 | 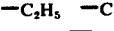 | |
| 262 | 5—SO₂—N(C₂H₅)₂ | | | | | | |
| 263 | 4—SO₂—N(piperidine) | | | | | | |
| 264 | 6—SO₂—N(piperidine) | | | | | | |
| 265 | 5—SO₂—N(C₂H₅)₂ | | | | | | |
| 266 | 5—SO₂—N(C₂H₅)₂ | | | | | —CH₃ | —CH₃ |

When a triazene compound of formula II is used as colour former the azo coupling component preferably Among the naphthol those of the formula

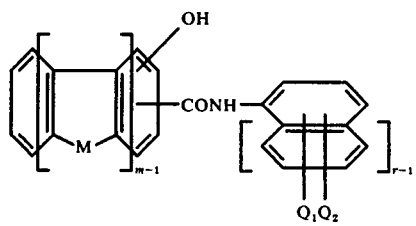

are of special interest, in which M is —NH—, —S— or —O—, $Q_1$ and $Q_2$ each represent hydrogen, nitro, halogen, alkyl with 1 to 4 carbon atoms or alkoxy with 1 to 4 carbon atoms, m and r are each 1 or 2.

Naphthylamines which are very valuable correspond to the formula

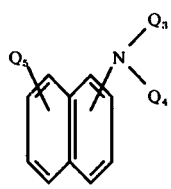

in which $Q_3$ and $Q_4$ each represent hydrogen, alkyl with 1 to 4 carbon atoms, benzyl or phenyl or where $Q_3$, $Q_4$ and the nitrogen atom to which they are bound together form a heterocyclic ring system with one or two rings consisting of carbon, nitrogen and at most one oxygen as ring members, each ring containing 5 to 7 ring members and the ring system containing at most 10 ring members and $Q_5$ is hydrogen or a sulfonic acid group.

All the azo couplers suitable for use in the present invention are of the well known couplers used for making azo dyestuffs and they thus are known as such and are prepared by well known methods.

The following naphthols of formula XI e.g. are very suitable as coupling components:

Table IV

| | symbols in formula (XI) | | | | | |
|---|---|---|---|---|---|---|
| No. | position of —OH | position of —CON-H— | m | M | r | $Q_1$ | $Q_2$ |
| 301 | 2 | 3 | 1 | — | 1 | H | H |
| 302 | 2 | 3 | 1 | — | 1 | 4-Cl | H |
| 303 | 2 | 3 | 1 | — | 1 | 4-Cl | 2-CH$_3$ |
| 304 | 2 | 3 | 1 | — | 1 | H | 2-OCH$_3$ |
| 305 | 2 | 3 | 1 | — | 1 | H | 2-CH$_3$ |
| 306 | 2 | 3 | 1 | — | 1 | 3-NO$_2$ | H |
| 307 | 2 | 3 | 1 | — | 1 | 5-OCH$_3$ | 2-OCH$_3$ |
| 308 | 2 | 3 | 1 | — | 1 | 4-OCH$_3$ | H |
| 309 | 2 | 3 | 1 | — | 1 | 4-OCH$_3$ | 3-Cl |
| 310 | 2 | 3 | 1 | — | 1 | 5-Cl | 2-CH$_3$ |
| 311 | 2 | 3 | 1 | — | 1 | 4-CH$_3$ | H |
| 312 | 3 | 4 | 2 | NH | 1 | 4-Cl | H |
| 313 | 2 | 3 | 2 | O | 1 | 5-OCH$_3$ | 2-OCH$_3$ |
| 314 | 2 | 3 | 1 | — | 2 | H | H |

Napthylamines of formula XII e.g. are:

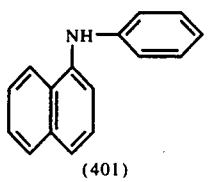
(401)

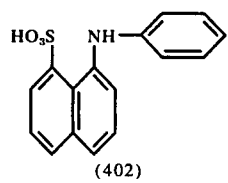
(402)

Further suitable azo couplers correspond to these formulae:

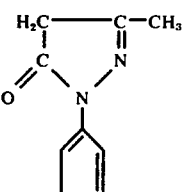
(403)

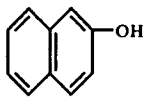
(404)

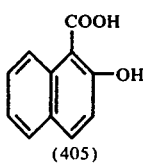
(405)

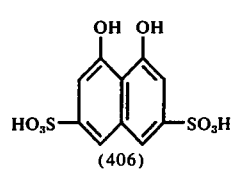
(406)

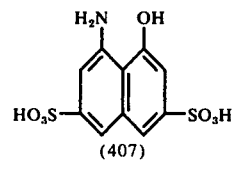
(407)

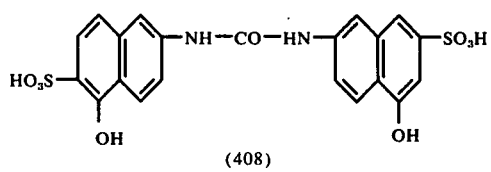
(408)

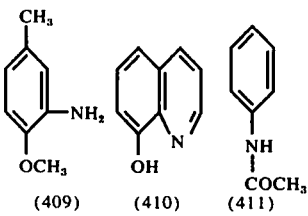
(409) (410) (411)

With these colour formers a large variety of colours may be produced ranging from orange to violet. Mixtures of such colour formers are suitable to give neutral shades such as grey. A special advantage of the triazenes is the light fastness of the colours they produce.

If desired the colour formers containing an azo group of formulae I or II, defined above, can be used in admixture with other known colour formers, such as crystal violet lactone (CVL) or benzoyl leuco methylene blue (BLMB) in order to change the colour of the image produced.

The invention will be illustrated by the following Examples in which parts are by weight.

EXAMPLE 1

A printing ink was produced using nitrocellulose as the base for the vehicle. The vehicle was formed by mixing the following ingredients:
31 parts nitrocellulose
120 parts methylated spirits
18 parts 2-ethoxyethanol An ink was then formulated from the following ingredients:
0.07 parts colour former No. 25 in Table 1
5.0 parts of printing ink vehicle
4.0 parts methylated spirits
0.4 parts triethanolamine When fully dissolved this ink contained 10% nitrocellulose.

The triethanolamine was dissolved in the methylated spirits before being mixed with the other ingredients.

The ink was printed on to the surface of a paper, but no colour reaction occurred, the ink simply producing yellow printing.

EXAMPLE 2

An activator solution was formed from 50 parts maleic acid, 50 parts water and 50 parts glycerine. 7 parts of this were then placed on an uninked stamp pad and the printed paper produced in Example 1 was stamped with the activator solution. An instant and intense red colour was produced where the activator solution contacted the printing.

EXAMPLE 3

An ink was made from the following ingredients:
0.07 parts of colour former No. 32 in Table 1
5.0 parts of printing ink vehicle of Example 1
4.0 parts methylated spirits
2.0 parts butyl phthaloyl butyl glycollate
0.4 parts triethanolamine The ink was printed on to the surface of a paper coated with clay as in Example 1.

Five different activator solutions were produced as in Example 2, using the following acids:
maleic acid
citric acid
malic acid
tartaric acid
succinic acid When placed on an uninked stamp pad and stamped on the printed paper a strong red colour was immediately produced.

We claim:
1. An image producing system which comprises a substrate having printed on at least a portion of a surface thereof an ink having a pH of about 7, containing a liquid alkanolamine present in an amount sufficient to prevent reaction between the color former and the substrate on which the ink is printed and a color former of the formula I

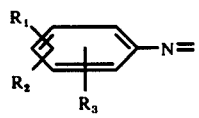

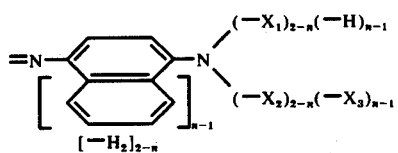
(I)

in which $R_1$, $R_2$ and $R_3$ each represents hydrogen, halogen, alkyl, alkoxy, aryloxy, alkoxycarbonyl, dialkylaminocarbonyl, acylamino, acyl(alkyl)amino,

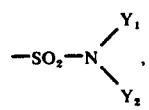

in which $Y_1$ and $Y_2$ each represents alkyl or aryl, or in which $Y_1$ and $Y_2$ together represent an alkylene group; $X_1$ is hydrogen or an alkyl group, $X_2$ is an alkyl, cyanoalkyl or arylmethylene group or $X_1$ and $X_2$ together represent an alkylene group, $X_3$ is an alkyl or aryl group and n is 1 or 2, or of the formula II:

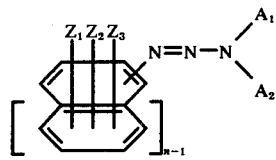
(II)

in which $Z_1$, $Z_2$ and $Z_3$ each represents hydrogen, alkyl, substituted alkyl, alkoxy, halogen, nitro, acylamino, aminoacyl or alkoxycarbonyl, $A_1$ and $A_2$ each represents alkyl or phenyl or $A_1$ and $A_2$ together with the nitrogen atom to which they are bound form a heterocyclic ring system and n is 1 or 2 and which system also comprises a carrier material impregnated with a solution of an organic acid in a weakly volatile solvent having a boiling point of a least 150° C and insofar as a color former of the formula II is used, the carrier is also impregnated with an azo coupling component.

2. A system as claimed in claim 1 in which the amount of organic base in the ink is up to 40% by weight.

3. A system as claimed in claim 2 in which the amount of organic base in the ink is from 0.2 to 6% by weight.

4. A system as claimed in claim 1 in which the ink also contains a platiciser inert to the colour former, but is a solvent for it.

5. A system as claimed in claim 4 in which the ink contains 5 to 15% by weight based on the vehicle, of plasticiser.

6. A system as claimed in claim 1 in which the ink is a gravure or flexographic ink.

7. A system as claimed in claim 1, in which the amount of colour former in the ink is from 0.01% to 2% by weight.

8. A system as claimed in claim 1 in which the ink also contains a pigment.

9. A system as claimed in claim 1 in which the ink contains as vehicle nitrocellulose, zinc resinate, or polyamide resin, a vinyl, acrylic or alkyd resin, ethyl cellulose, a stand oil or a rosin modified stand oil.

10. A system as claimed in claim 1, in which the substrate is paper which has been formed using a neutral or alkaline size.

11. A system as claimed in claim 1, in which the carrier is a fabric, a paper or a felt or fabric pad.

12. A system as claimed in claim 1, in which the organic acid is selected from maleic acid, oxalic acid, malonic acid, succinic acid, glutaric acid, adipic adid, tricarballylic acid, diglycollic acid, lactic acid, malic acid, tartaric acid, citric acid, pyrophosphonic acid, benzene sulphonic acid, naphthalene-2-sulphonic acid, 1-phenol-4-sulphonic acid, polymaleic acid, co- and terpolymers of maleic acid with ethyl acrylate and vinyl acetate, hydroxyethane diphosphonic acid, methylamino-N-N-di-methylene phosphonic acid.

13. A system as claimed in claim 1, in which the carrier material is impregnated with from 5–200% of its dry weight of the organic acid solution.

14. A system as claimed in claim 1, in which the amount of organic acid in the solvent is such as to give a saturate solution.

15. The ink as defined in claim 1.

16. A process for producing an image which comprises printing on to a substrate an ink as claimed in claim 15 impregnating a carrier material with a solution of an organic acid in a weakly volatile high boiling solvent and transferring the organic acid on to the said printed ink.

* * * * *